(12) United States Patent
Pal

(10) Patent No.: US 7,058,631 B1
(45) Date of Patent: Jun. 6, 2006

(54) METHODS AND SYSTEM FOR ACCESSING LOGICAL RELATIONSHIP DATA IN A DATABASE FROM A DATA-ACCESS SYSTEM UTILIZING BOOKMARKS

(75) Inventor: Suprio Pal, Corona, CA (US)

(73) Assignee: Unisys Corporation, Blue Bell, PA (US)

( * ) Notice: Subject to any disclaimer, the term of this patent is extended or adjusted under 35 U.S.C. 154(b) by 367 days.

(21) Appl. No.: 10/163,103

(22) Filed: Jun. 4, 2002

(51) Int. Cl.
*G06F 17/30* (2006.01)

(52) U.S. Cl. ............ 707/10; 707/2; 707/3; 707/4; 707/100

(58) Field of Classification Search ............ 707/102, 707/2, 3, 4, 5, 6, 10, 100
See application file for complete search history.

(56) References Cited

U.S. PATENT DOCUMENTS

| | | | |
|---|---|---|---|
| 5,848,273 A | 12/1998 | Fontana et al. | |
| 5,895,477 A | 4/1999 | Orr et al. | |
| 5,926,807 A * | 7/1999 | Peltonen et al. | 707/3 |
| 6,078,920 A | 6/2000 | Tan et al. | |
| 6,782,394 B1 * | 8/2004 | Landeck et al. | 707/104.1 |

OTHER PUBLICATIONS

Oracle Corporation, Oracle8 Server Distributed Database Systems, copyright 2000, pp. 1-13, <http://www-rohan.sdsu.edu/doc/oracle/server803/A54653_01/toc.htm>.*
Unisys, Servers, copyright 2000, pp. 1-2,□□<http://web.archive.org/web/20000815210207/www.unisys.com/hw/servers/>.*
Elmasri et al., Fundamentals of Database Systems, copyright 2000,Buschlen/Mowatt Fine Arts Ltd., Third Edition, pp. 448-451.*
Elmasri et al., Fundamentals of Database Systems, copyright 2000, Buschlen/Mowatt Fine Arts Ltd., Third Edition, pp. 204, 205, 253 and 254.*

* cited by examiner

*Primary Examiner*—Shahid Alam
*Assistant Examiner*—Hung Pham
(74) *Attorney, Agent, or Firm*—Alfred W. Kozak; Mark T. Starr; Nathan Cass

(57) ABSTRACT

In a computer-based information system where a client application accesses data in a network data modeled database via a data-access system utilizing bookmarks, methods are disclosed for allowing the data-access system to access logical-relationship data and metadata in a network data modeled database, and to present the accessed logical-relationship data and metadata to the client application in a format recognized by the client application. Other methods are disclosed for allowing a client application to access a table referenced by a network data modeled database via a data-access system utilizing bookmarks, and to modifying a logical relationship link to the accessed referenced table. In this way, a client application can directly access and modify logical relationship data stored in the network data modeled database via a data-access system utilizing bookmarks.

11 Claims, 13 Drawing Sheets

METHODS AND SYSTEM FOR ACCESSING LOGICAL RELATIONSHIP DATA IN A DATABASE FROM A DATA-ACCESS SYSTEM UTILIZING BOOKMARKS

FIELD OF THE INVENTON

This invention relates to the field of computer based information systems such as a computer networked databases. More particularly, the present invention is directed to methods and system for accessing logical-relationship data in a database from a data-access system which utilizes bookmarks.

BACKGROUND OF THE INVENTON

Computer based information systems are in widespread use today, ranging from simple small area file-sharing networks to global and sophisticated computer networked databases which provide the backbone for today's World Wide Web.

Generally, a user can access information stored on computer networked databases utilizing a client application such as a Windows™ application, which resides at the user's location such as on the user's personal computer. The client application is typically interfaced to a data-access system which is in turn interfaced to the computer networked database at a local or remote location. Pursuant to a request by a user to obtain a desired information, the client application communicates with the data-access system which in turn communicates with and queries the computer networked database for the requested information. Once the information is found, it is forwarded to the client application via the data-access system for presentation to the user.

Computer networked databases are generally designed to store data in data tables. Each table typically contains a set of rows, with each row having column-attributes in which the data is stored. For ease of search and access, information stored in each table is often categorized based on predetermined characteristics of the stored data. For example, in a university database system a table may be devoted to store information on the faculties where each row in the table contains the name of one faculty member, and where the information about that member such as age, identification numbers and years of experience are each stored in a separate column-attribute of that row. Still, another table may be similarly devoted to the names and description of courses offered by the university.

When a particular information is frequently needed that involves data stored in more than one table, such as determining what courses a faculty member is teaching during a semester, a logical link is established between the one or more tables containing the information. An advantage of this technique is the resulting reduction in excessive duplication of the same data on various tables which squanders memory space in the system. Another advantage is the facilitating of the modification of the data by limiting the scope of the data modification to one or few tables. A logical relationship, such as a link, is thus established between the faculty members table and the courses table. Generally, this logical relationship connects a row in the first table, called the referencing table, to a particular row in the second table, called the referenced table. The data on this logical relationship is then stored in a column-attribute of a row in the referencing table. For example, to show that Professor Smith teaches Calculus III, a logical relationship is established between the row in the faculty table containing data on Professor Smith, which points to the row in the courses table containing data on Calculus III. The data on this logical relationship is then stored in a column-attribute of the row containing data on Professor Smith. A user, such as a student who seeks information on what course Professor Smith teaches, can then query the faculties table for Professor Smith and be directed by the logical relationship data to the row in the courses table containing data on Calculus III.

Currently, data-access systems play an important role in establishing an interface between the client application and the computer networked database server. A key feature of a data-access system is the ability to query a networked database for information request by a client application. Such data-access systems are implemented based on data-access models which provide underlying standard data access specifications for the data-access system. One form of such data-access model is the Object Linking and Embedding Database (OLE DB) Data Access on which an OLE DB data-access system is based.

While in widespread use today, OLE DB-based data-access systems are not without shortcomings. Although the OLE DB model provides a rich repertoire of data types and specifies an extensive set of Component Object Model (COM) interfaces that provide applications with uniform access to data stored in diverse information sources, the concept of logical relationship data is foreign to the model. This lack of data type and functional support in the OLE DB model for access to logical relationship data results in the inability of an OLE DB-based data-access system to obtain logical relationship data from a computer networked database. This shortcoming in turn prevents a client application such as a Windows™ application to access logical relationship data in the computer networked database. Under this circumstance, a user in the example above would not be able to obtain information on what course Professor Smith teaches because the logical relationship link pointing to the courses table will remain hidden from the OLE DB data-access system interfacing with the university's computer networked database. This will in turn disadvantageously limits the scope of data that can be retrieved from a computer networked database by a user.

An ongoing need thus exists to allow a client application using an OLE DB data-access system to interface with a computer networked database to access logical relationship data in the computer networked database.

SUMMARY OF THE INVENTION

It is an object of the present invention to provide a method and system for allowing a data-access system utilizing bookmarks to access logical-relationship metadata in a network data modeled database.

Another object of the present invention is to provide a method and system for presenting to a client application logical-relationship metadata of a network data modeled database interfacing with the client application via a data-access system utilizing bookmarks.

Yet another object of the present invention is to provide a method and system that allows a data-access system utilizing bookmarks to access a table referenced by a network data modeled database.

Yet another object of the present invention is to provide a method and system for modifying a logical relationship link to a table referenced by a network data modeled database from a client application interfacing with the database via a data-access system utilizing bookmarks.

An advantage of the present invention is to provide a client application with direct support in the data-access system to access logical relationship link data and metadata in the network data modeled database.

Another advantage of the present invention is to provide a client application with direct support in the data-access system to modify logical relationship links in the network data modeled database.

These and other objects, which will become apparent as the invention is described in detail below, are provided in the context of a computer-based information system where a client application accesses data in a network data modeled database via a data-access system utilizing bookmarks, wherein a method is disclosed for allowing the data-access system to access logical-relationship metadata in a network data modeled database. The method includes searching the network data modeled database for the logical-relationship metadata, and forwarding the logical-relationship metadata to the data access system.

Another method is disclosed for presenting to a client application logical-relationship metadata of a network data modeled database interfacing with the client application via a data-access system utilizing bookmarks. The method includes obtaining the logical-relationship metadata from the network data modeled database via the data-access system, then creating a metadata schema table based on a predetermined format recognized by the client application, and finally storing the obtained logical-relationship metadata at a predetermined location in the table.

Yet a third method is disclosed for allowing a data-access system utilizing bookmarks to access a table referenced by a network data modeled database. The method includes obtaining from the network data modeled database logical-relationship data referencing the table, and accessing the table from the data-access system based on the obtained logical-relationship data.

A fourth method is also disclosed for modifying a logical relationship link to a table referenced by a network data modeled database from a client application interfacing with the database via a data-access system utilizing bookmarks. The method includes obtaining from the network data modeled database logical-relationship data referencing the table, and modifying the logical relationship link to the table based on the obtained logical-relationship data.

Still other objects, features and advantages of the present invention will become readily apparent to those skilled in the art from the following detailed description, wherein is shown and described only the exemplary embodiments of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings.

DETAILED DESCRIPTION OF THE INVENTION

Figure 1:
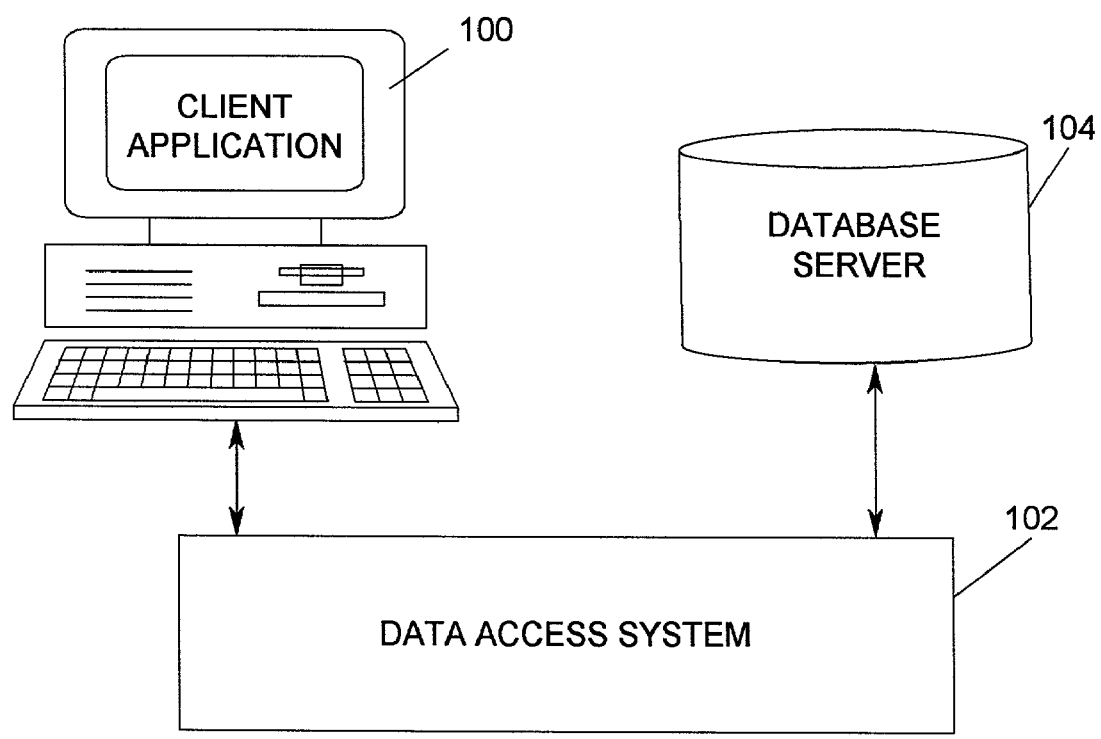
FIG. 1 is a top-level block diagram of a system that may employ the methods and systems of the present invention.

Several embodiments of the present invention are described herein in the context of accessing logical-relationship data in a database from a data-access system which utilizes bookmarks. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. The present invention may be practiced in conjunction with various data-access systems which follow the Object Linking and Embedding Database (OLE DB) Data Access Model and are conventionally used in the art, and only so much of the commonly practiced operations are included herein as are necessary to provide an understanding of the present invention. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Before proceeding with a description of the systems and methods of the present invention, a summary of Terminology used herein is provided, which may be helpful in understanding the disclosed embodiments.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

A Link is a reference or pointer to another data entity, such as an object or a table, and implies a relationship to that other entity. Link data items are used to link one data set record, such as table rows, to another, and represent a logical relationship between records. Generally, a link logically connects a row in one table to a row in another table, although databases often provide the flexibility for relationships to be maintained between two rows in the same table. A reference is typically used when it is desired not to duplicate data. For example, the customer account object could store the customer's name and address as attributes but if the customer opened multiple accounts then the customer's name and address would appear in multiple account objects. Therefore, it is desirable to define a separate customer object and place the name and address as attributes of the customer object. The customer account object would then contain a reference to the customer object.

Bookmarks are placeholders that enable the user to return quickly to a row in a table. Typically, a database application assigns a bookmark which points to a particular row or set of rows in a table. The user can then use the bookmark to directly access that row in a table at a later time.

Metadata are information on the structural setup of a database for storing data (i.e., information about data). Typically, metadata contain information on the database schema tables which are the blue prints for the structure of the data tables, and are followed by the database programs which generate, administer and modify the data tables.

Referring now to the drawings and FIG. 1 in particular, a top-level block diagram of a system that may employ the methods and systems of the present invention is shown. A client application 100 executing on a computing system is illustrated. The client application 100 is in communication with data access system 102 which in turn is in communication with database server 104. Database server 104 may be local or at a remote location relative to the computing system executing client application 100. The data access system 102 is tasked with receiving requests for data from client application 100, then communicating with the database 104 to obtain the requested data, and providing the client application with the obtained data. For simplicity, only one computing system executing a client application 100 is illustrated in FIG. 1 although it should be noted that many more computing systems on which multiple client applications 100 reside may also be coupled to the data access system 102 to access a number of database servers 104.

Figure 2:
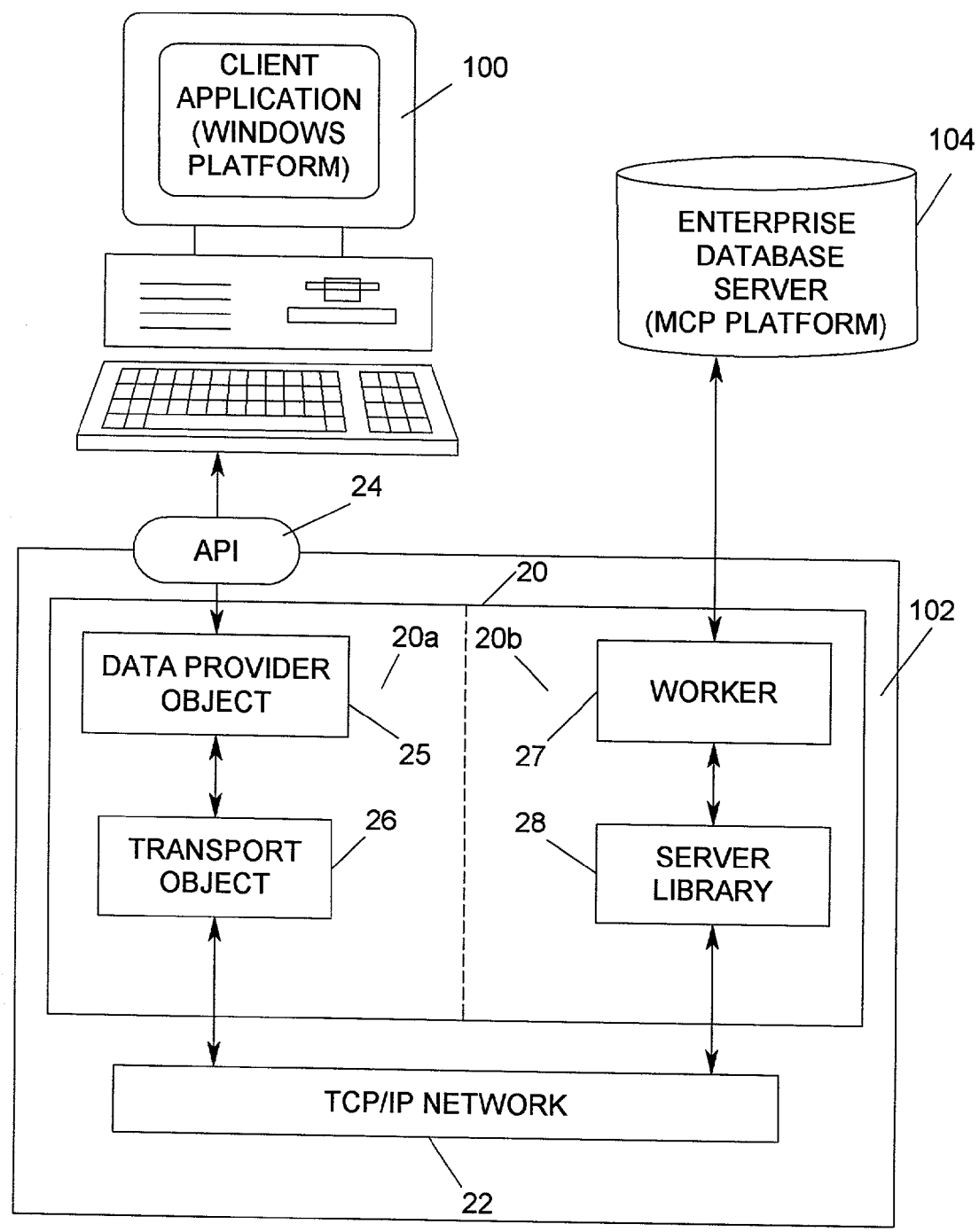
FIG. 2 is an expanded block diagram of an exemplary system that may employ the methods and systems of the present invention.

FIG. 2 is an expanded block diagram of an exemplary system that may employ the methods and systems of the present invention as shown in FIG. 1. To better illustrate the functioning of the present invention, an exemplary embodiment of the present invention is used throughout the specifications in which the data-access system 102 is a Unisys OLE DB Data Provider utilizing bookmarks and interfacing with a Windows™ client application 100 (such as substantially all versions of Microsoft Windows released from 1995–2000, Windows NT and XP) at one end and with an Enterprise Database server 104 operating on a Clear path Master Control Program (MCP) platform at the other end, although it should be noted that the present invention is not in anyway limited to the foregoing exemplary products.

As shown in FIG. 2, the data access system 102 includes the OLE DB Data Provider 20 and the communication subsystem 22. The OLE DB Data Provider 20 is a two-tiered request processing application that includes a client-end 20a and a server-end 20b which communicate with one another via the communication subsystem 22, such as a TCP/IP network. The client-end 20a includes data provider 25 and transport object 26, while the server-end 20b includes the server library 28 and worker 27. The OLE DB Data Provider 20 enables the client application 100 to request data from the Enterprise Database Server 104 operating on Clear path Master Control Program (MCP) platform (also known as DMSII by those skilled in the art). The Windows™ client application 100 can be remote or it can be executing on the Windows™ operating system side of a Clear Path MCP server. In an exemplary embodiment, the client application 100 runs on the same platform as the client-end 20a of the OLE DB Data Provider 20.

The overall operations of the present invention will now be disclosed in greater detail in FIGS. 3–10 in conjunction with FIG. 2. As shown in FIG. 2, a client-request for information from the client application 100 is received by the data provider 25 which interacts with the client application via an application program interface (API) 24. In an exemplary embodiment, the data provider 25 presents an OLE DB data source API 24 to the client application 100. Once the client-request is received in the data provider 25, the data provider 25 then passes the client-request to the transport object 26. The transport object 26 is adapted to use the communication subsystem 22 to forward the client-request to server-end 20b, at where it is ultimately received by worker 27 which is activated on demand by the sever library 28. The worker 27 then interacts with the Enterprise Database Server 104 to search for and obtain the requested information from the Enterprise Database Server 104. Once the information is obtained, the worker 27 stores the information in an OLE DB-compliant data format and forwards it back to the data provider 25 via the communication subsystem 22 and transport object 26. The data provider 25 subsequently converts the information received from the worker 27 into a predetermined format recognized or requested by the client application 100 and then presents the information to the client application 100 in that format. In an exemplary embodiment of the present invention, the worker 27 and data provider 25 each include data-storage capabilities such as random-access-memory (RAM) or a magnetic data-storage disk for storage of received data.

In an exemplary embodiment, three types of data provider 25 are included within the OLE DB Data Provider 20: 1) Enterprise Database Server data provider such as Unisys.DMSII or Unisys.DMSII.1, which supports read/write access to data form the Enterprise Database Server 104; 2) MCP Data File data provider such as Unisys.NXFile or Unisys.NXFile.1, which allows read-only access to data from MCP sequential, relative and indexed (KEYEDIO and KEYEDIOII) files; and 3) DMS data provider, which allows access to databases on ClearPath OS 2200 databases. Generally, a client application 100 initiates one such data provider 25 for each database 104 from which it requires data by creating an instance of the data provider 25 as data source. A client application 100 can initiate simultaneous data providers 25. The databases 104 can be on the same or different systems. In turn, the data provider 25 request starts a single transport object 26 and worker 27 which retrieve data from the database 104 and return it to the data provider 25 for presentation to client application 100. In an exemplary embodiment using the Windows™ application, Microsoft multithreading operation is supported during this process.

Typically, a data provider 25 initiates a worker 27 to perform the activities for data retrieval from database 104 required by the data provider 25. The worker 27 also retrieves the data from the database 104 and prepares it for transport through the server library 28 and the communication subsystem 22 to the transport object 26. The data provider 25 operations are terminated by the client application 100, but as long as the data provider 25 is active, the client application 100 can continue to use it for data requests. The system automatically terminates the operations of the worker 27 once the operations of data provider 25 that the worker 27 has been serving has also been terminated.

Although currently OLE DB data providers enjoy widespread usage for retrieval of data from databases, improvements can always be made, particularly when the OLE DB Data Providers are used for accessing data from a network data modeled database.

In network data modeled databases, data are stored in data tables with each table typically containing a set of rows, each row having column-attributes in which the data is stored. For ease of search and access, information stored in each table is often categorized based on predetermined characteristics of the stored data. When particular information are frequently needed that involves data stored in more than one table, a logical link is established between the two or more tables containing the information. An advantage of this technique is the resulting reduction in excessive duplication of the same data on various tables which squanders memory space in the system.

Figure 3:
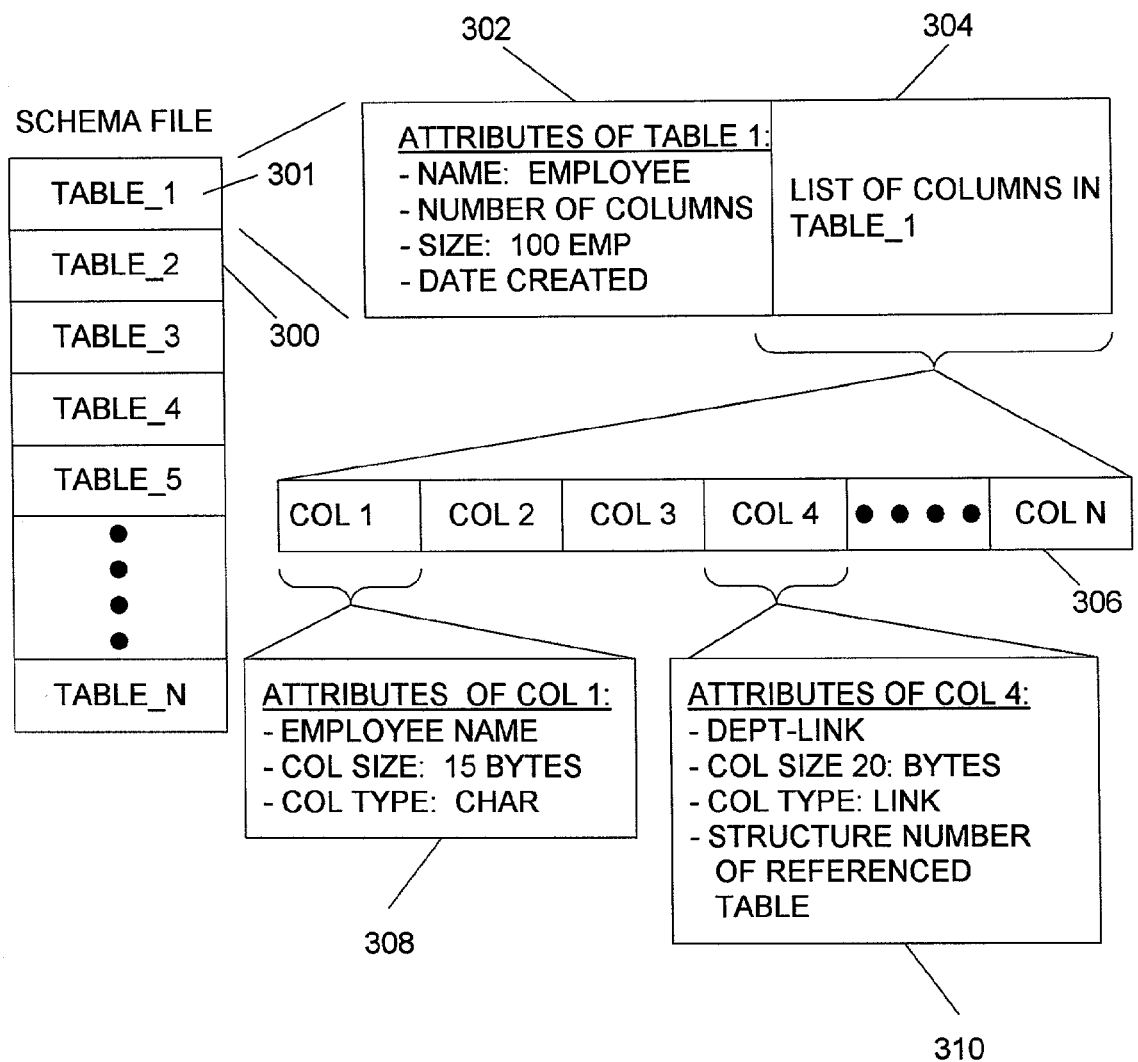
FIG. 3 is a schematic diagram illustrating an exemplary database schema file.
Figure 4:
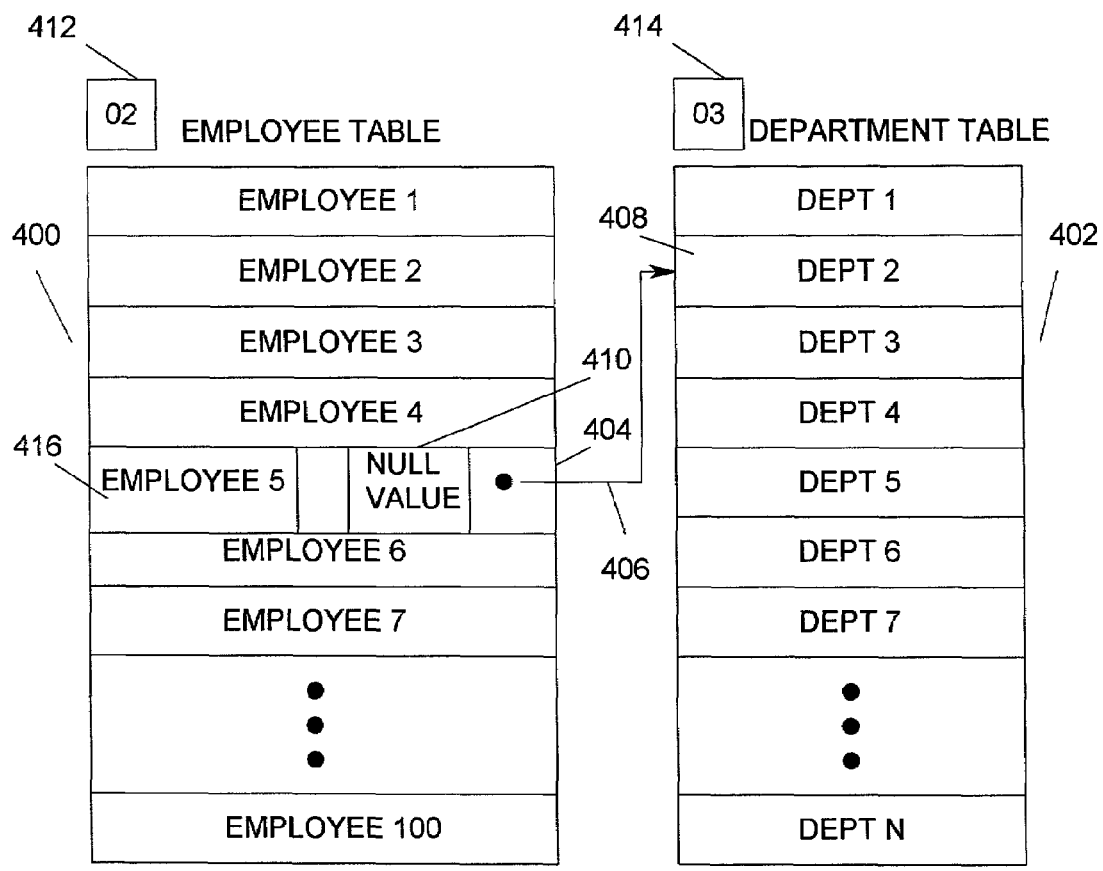
FIG. 4 is a schematic diagram illustrating the concept of logical relationship between two tables in a database.

FIG. 3 and FIG. 4 illustrate the foregoing concepts used in a network data modeled database. As shown in FIG. 3, a database schema file 300 is initially created for the data tables of the database. The schema file 300 serves as a blueprint which specifies the structural characteristics of each table to be created and used by the database system. This information on the storage structure of data in a database is commonly known as metadata by those skilled in the art. For illustrative purposes, the schema file 300 is used for a database that maintains data on a corporation, and Table_1 301 is used as an example for a table that would contain information on the employees of the corporation.

As shown, metadata of Table_1 301 includes attributes 302 and 304. Attribute 302 contains metadata on the attributes of an employee table created based on this metadata, such as specifying the table to bear the name of Employee, number of columns it must have, size of table (here to be set to 100 indicating that the table is to be large enough to hold a 100 employee records) and other information such as the date the table was created, last updated etc. Attribute 304 contains instruction on how each employee record is to be setup within the Employee table. As shown, each employee record is to contain a number of column-attributes 306, the total number of which was determined in attribute 302. Each column-attribute is then given its own internal information structure, such as those shown in attribute blocks 308 and 310 corresponding to Col. 1 and Col. 4, respectively. Metadata in attribute block 308, for example, indicate that the first attribute for each employee's record shall contain the name of the employee, and that 15 bytes of type character can be used for storage of the employee name. Attribute block 310, however, contains logical relationship data between the employee table and a referenced table, such as the one containing the names of the departments. This logical relationship data is used to determine which department an employee works for by following the link to a particular department in a department table. As shown, the metadata in attribute block 310 indicate that Col. 4 is of type LINK, points to Dept table, and that the logical relationship data representing this link can be up to 20 bytes long. A metadata designation, such as table name or a structure number assigned by the system to each table, is also stored in the attribute to facilitate the locating of the referenced table.

FIG. 4 illustrates two tables 400 and 402 created by a database management system based on the schema metadata of FIG. 3. As shown, Employee Table 400 was created based on attributes 301 and 304 in FIG. 3. As specified by the metadata in attributes 301 and 304, Table 400 is named the Employee Table and allocated a capacity for storing records of 100 employees, wherein each employee's record, such as record 416 for Employee 5, is subdivided into various columns for storage of Employee 5's data. For simplicity of illustration, only record 416 for Employee 5 is shown in a columned-partitioned format, and contains the Link-data-type column-attributes of the type shown in block 310 of FIG. 3. Also shown are the metadata designations 412 and 414 in form of structure numbers 02 and 03 assigned by the system to tables 400 and 402, to facilitate the locating of each table. As shown in FIG. 4, a given record may contain more than one Link-data-type column-attribute, such as those shown in column-attributes 410 and 404 of record 416. The Link-data-type column-attribute 404 contains logical relationship data 406 that points to the Department Table

402, having been assigned a structure number, such as 03, by the system. In the example of FIG. 4, the Link-data-type column-attribute 404 contains logical relationship data 406 that points to row 408 of the Department Table 402, signifying that Employee 5 works for Dept 2. If at a given time, a Link-data-type column-attribute is to not point to a particular location, then it is assigned a Null-value to, such as shown for the column-attribute 410 in FIG. 4.

In an OLE DB environment, a major function of the OLE DB provider is to first expose metadata schema files types stored in network modeled databases as OLE DB-compliant data sources and make this OLE DB-compliant metadata accessible for inquiry requested by the client applications interfacing with the OLE DB provider. The client application utilizes the obtained metadata information to gain knowledge on the layout of the database tables based on which it can instruct the OLE DB provider access or modify real data stored in the data tables. While the OLE DB model provides a rich repertoire of data types and specifies an extensive set of Component Object Model (COM) interfaces that provide client applications with uniform access to data stored in diverse information sources, the concept of logical relationship data and metadata is generally foreign to the model. This virtual lack of data-type and functional support in the OLE DB for access to logical relationship metadata results in the inability of an OLE DB-based data-access system to obtain logical relationship data from a computer networked database. This in turn prevents a client application such as a Windows™ application to access logical relationship data in the computer networked database.

Figure 5A:
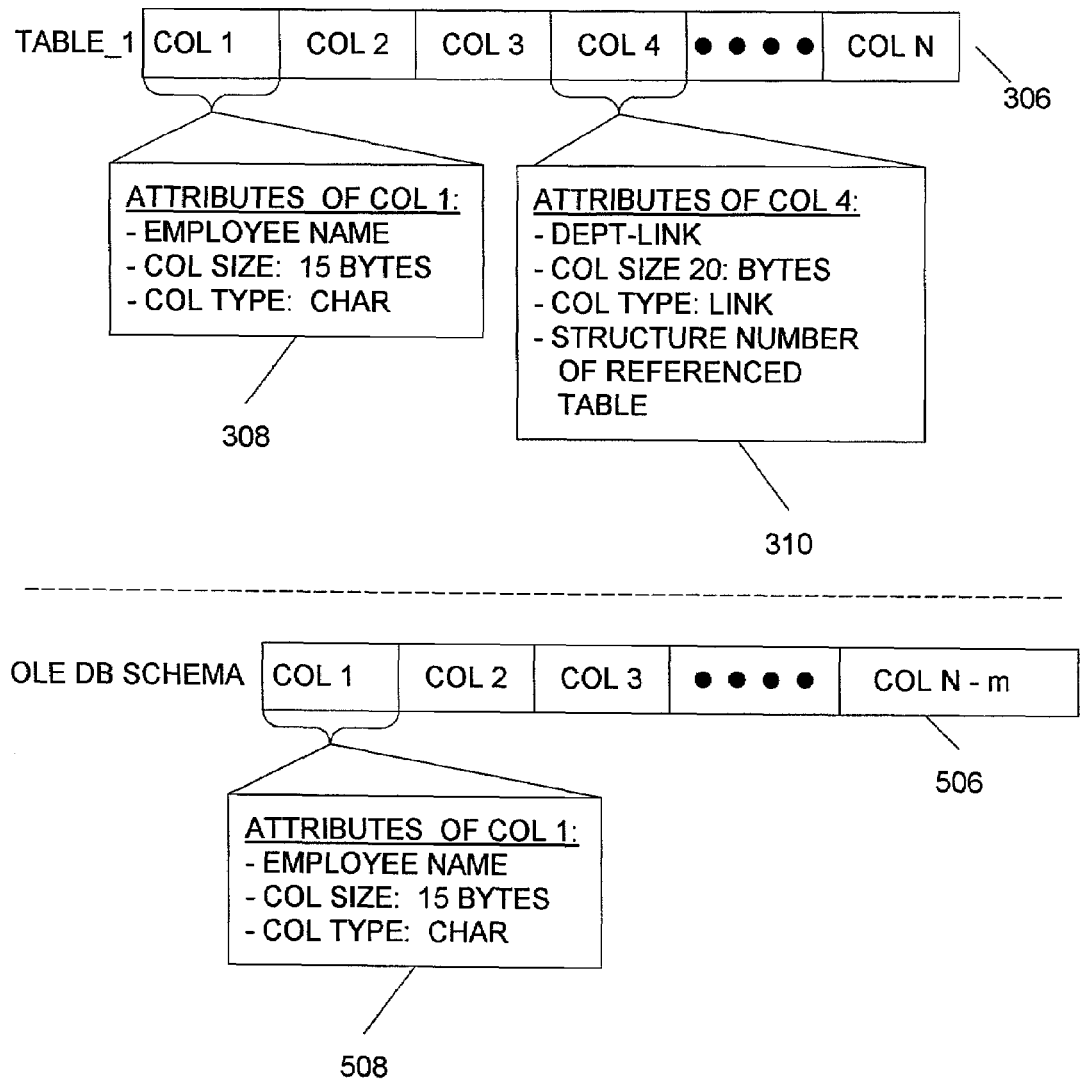
FIG. 5A is a table diagram illustrating the creation of a prior art OLE DB-compliant metadata from the database metadata.

FIG. 5A illustrates the foregoing deficiency of a prior art OLE DB provider in accessing logical relationship metadata from a network modeled database. For simplicity, the metadata for Table_1 in FIG. 3 is used in the example, a portion of which is duplicated in FIG. 5A for ease of illustration. As shown, an OLE DB provider first creates an OLE DB-compliant schema (metadata) 506 based on the database schema metadata for Table_1 by searching the metadata of Table_1 for column-attributes of data-types that the OLE DB provider is familiar with, such as Char and Integer data-types. Generally, for these column-attributes of familiar data-types, each column-attribute in the OLE DB-compliant schema is a substantial duplicate of the corresponding column-attribute in the network modeled database schema, so that for example the attributes 508 for the corresponding Col. 1 in the OLE DB-compliant schema 506 are virtually identical to the attributes 308 for Col. 1 in the network modeled database schema.

While this duplication is generally carried out for the column-attributes of familiar data-types such as Char, Integer etc, they are not so for the column-attributes of data-types such as Link that are foreign to the model. Thus, as shown in the example of FIG. 5, while accessing the metadata of Table_1, a prior art OLE DB provider will fail to include the Link-data-type column-attributes 310 in the OLE DB-compliant schema 506, such as for the Col. 4 in Table_1. The OLE DB-compliant schema 506 will thus have a shorter length of N-m for the total number of columns, where m is the number of Link-data-types column-attributes in the column-attributes schema 306 for Table_1. As a result of this lack of inclusion of Link-data-types in the OLE DB-compliant schema 506, the logical relationship between tables indicated by the Link-data-types, such as that shown in FIG. 4 between the Employee table 400 and the Department table 402 will not be provided to the client application 100 which would then remain unaware of the link between tables 400 and 402. Consequently, a user of the client application 100 will not be able to determine based on the obtained metadata as to which department an employee works for by accessing the Employee Table 400.

Figure 5B:
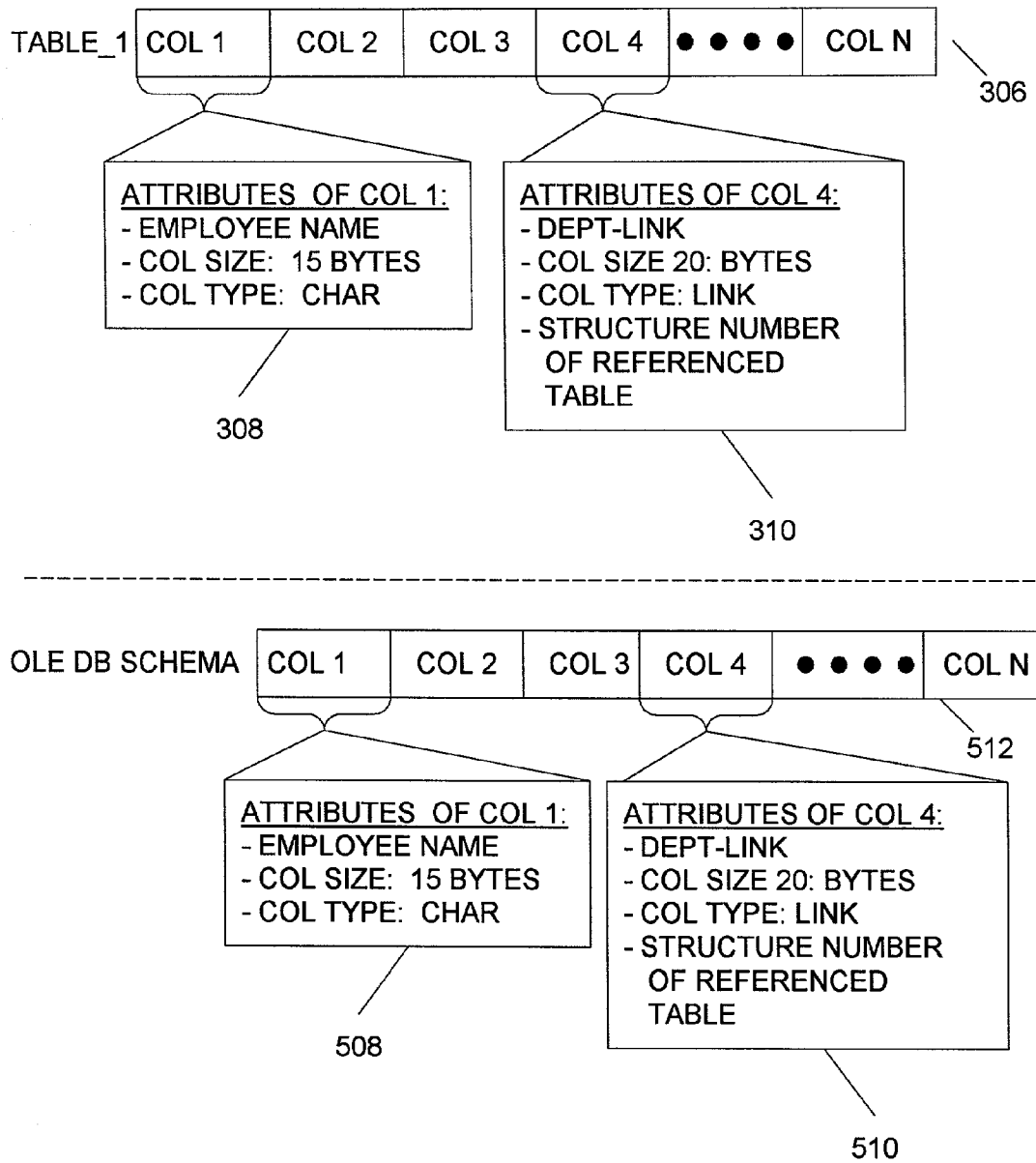
FIG. 5B is a table diagram illustrating the creation of an OLE DB-compliant metadata from the database metadata based on the method of the present invention.

FIG. 5B is a table diagram which in conjunction with the system shown in FIG. 2 illustrates a method of the present invention for creation of an OLE DB-compliant metadata schema from the network data modeled database schema wherein the created OLE DB-compliant metadata advantageously includes the Link-data-type in database metadata. For simplicity, the metadata for Table_1 in FIG. 3 is used to better demonstrate the workings of the present invention, a portion of which is duplicated in FIG. 5B for ease of illustration. As shown, an OLE DB provider 20 of the present invention first creates an OLE DB-compliant schema (metadata) 512 based on the database metadata for Table_1. The OLE DB provider 20 of the present invention, however, is adapted to search for the column-attributes of logical-relationship metadata data-type in the metadata of tables in the network data modeled database, such as those in column-attribute 310 of metadata 306 for Table_1. This is done by instructing the worker 27 interfacing with the network data modeled database to search for the column-attributes of logical-relationship metadata data-type in the metadata of tables in the network data modeled database. Once a column-attribute of logical-relationship data-type is found in a table, the worker 27 of the present invention of the present invention modifies the OLE DB-compliant schema corresponding to that table to include the logical-relationship metadata.

In FIG. 5B for example, the OLE DB provider 25 of the present invention searches the metadata 306 for Table_1 for column-attributes of logical-relationship metadata data-type. Once a column-attribute of logical relationship data-type is found in Table_1, such as Col. 4 having attributes 310, the present invention modifies the OLE DB-compliant schema 512 corresponding to Table_1 to include the found logical relationship metadata and its attributes. In an exemplary embodiment of the present invention, the modification is carried out by adding an extra column-attribute to the OLE DB-compliant schema corresponding to the searched database table, and storing the logical-relationship metadata obtained from the database table for the added column-attribute. As shown in FIG. 5B, an extra column-attribute of Col. 4 is added to the OLE DB-compliant schema 512 upon finding of the logical relationship data-type Col. 4 in Table_1, and thereafter the attribute 310 for Col. 4 are stored as attributes 510 for the added Col. 4 in the OLE DB-compliant schema 512. The OLE DB-compliant schema 512 will thus no longer have a shorter length of N-m for the total number of column-attributes as in the prior art OLE DB-compliant schema 506 of FIG. 5A.

One advantage of the foregoing feature of the present invention over the prior art is that logical relationship metadata in the schema tables of a network modeled database can be included in the corresponding OLE DB-compliant schema to be exposed to a client application. The client-application can then become aware of the existence of the logical relationships between the data tables in the network modeled database.

Once an OLE DB-compliant schema 512 has been created according to the present invention, it is forwarded by the worker 27 via the communication subsystem 22 and transport object 26 to the data provider object 25 for delivery to the client application 100. The data provider object 25, however, must present the OLE DB-compliant schema in a predetermined format for metadata schema tables that is recognized or requested by the client application 100. Since the prior art OLE DB providers do not include logical relationship metadata, they currently cannot present the Link-data-type metadata in the OLE DB-compliant schema 512 in a format that is recognized by the client application 100.

Therefore, in another embodiment, the present invention introduces a method and system for presenting to the client application 100, the logical-relationship metadata of a network data modeled database contained in a corresponding OLE DB-compliant schema file.

The present invention thus discloses a method for presenting to a client application obtained logical-relationship metadata of a network data modeled database interfacing with the client application via a data-access system utilizing bookmark. The method includes obtaining the logical-relationship metadata from the network data modeled database via the data-access system, then creating a metadata schema table based on a predetermined format recognized by the client application, and finally storing the obtained logical-relationship metadata at a predetermined location in the table. The present invention allows for a client application using an OLE DB data-access system to interface with a computer networked database to access logical relationship data in the computer networked database.

Figure 5C:
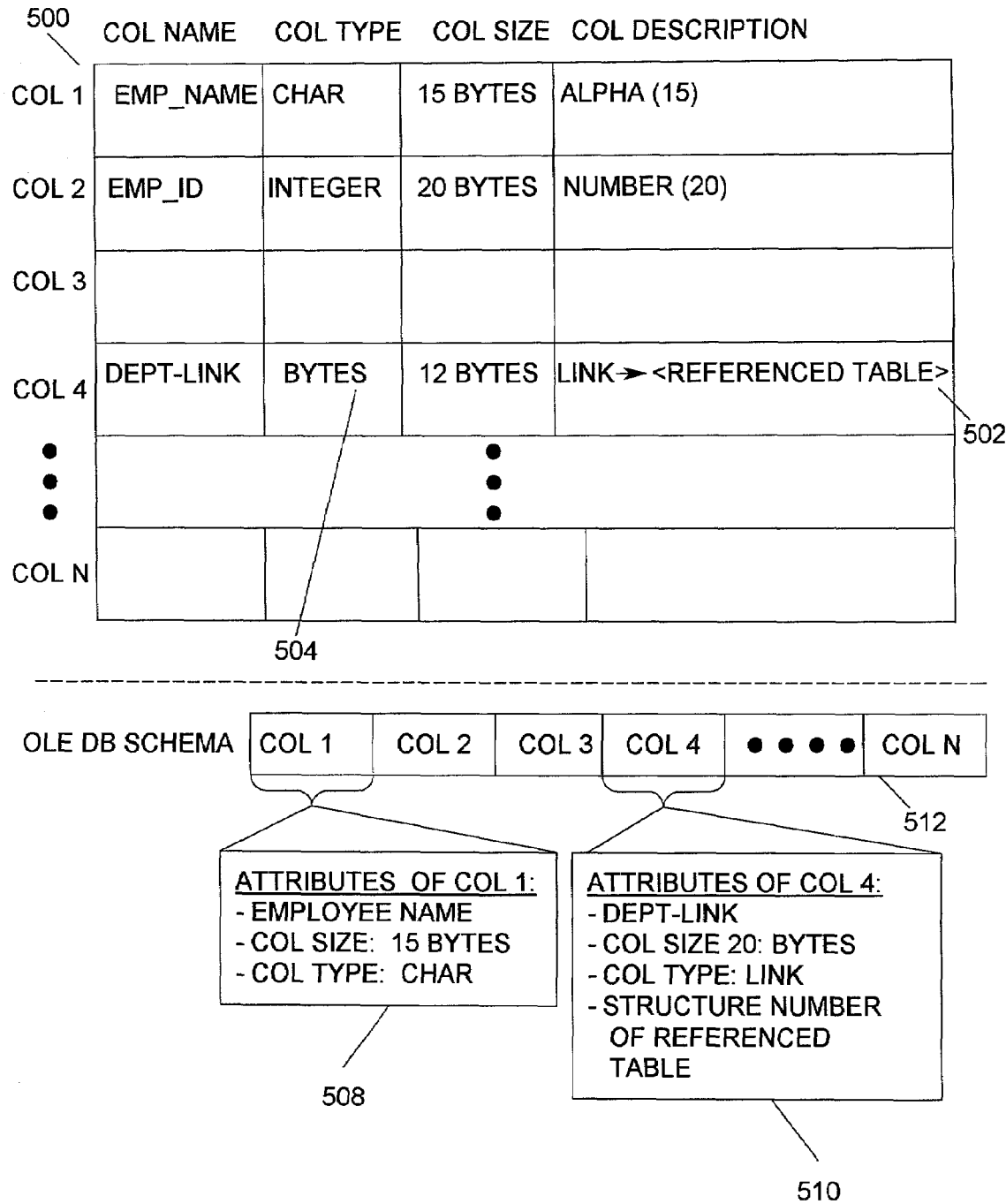
FIG. 5C is a table diagram illustrating a presentation method of the present invention.

FIG. 5C is a table diagram which in conjunction with the system shown in FIG. 2 illustrates a method of the present invention for presentation of an OLE DB-compliant metadata schema to a client application wherein the presentation includes the presentation of Link-data-types in the OLE DB-compliant metadata schema. For simplicity, the OLE DB-compliant metadata schema 512 of FIG. 5B is used to better demonstrate the workings of the present invention, and is duplicated in FIG. 5C for ease of illustration.

As shown in FIG. 5C, an exemplary metadata schema Table 500 corresponding to OLE DB-compliant schema 512 is first created based on a predetermined format recognized by a client application, and then the obtained logical-relationship metadata in the OLE DB-compliant schema 512 is stored in a predetermined locations 504 and 502 in the table 500. Schema Table 500 is created according to a predetermined format where each of the column-attributes in OLE DB-compliant schema 512 is represented in a separate row in Table 500. The attributes of each column-attribute such as those listed in attribute blocks 508 and 510 for Col. 1 and 4 are then inserted into predetermined column-attributes of Table 500. For example, the first column attribute in Table 500 is for storing of Col Name attribute in which the name of each column-attribute of OLE DB-compliant schema 512 is inserted from the information in the attribute blocks of OLE DB-compliant schema 512.

Other attributes in Table 500, for example the Col Type and Col Size, are dedicated to other information that are also inserted from the information in the attribute blocks of OLE DB-compliant schema 512. The attribute Col Description is a special attribute generally constructed from the information in other attributes in Table 500, and whose appearance may vary based on the designations used by the developers of the particular OLE DB Provider used. For example, in the environ of the exemplary Unisys OLE DB Data Provider used throughout the specification, the Col Description attribute for row corresponding to Col. 1, is constructed from Col Type and Col Size fields. A Unisys-specific data-type ALPHA is inserted to denote the character nature of Col. 1 obtained from Col Type, and appended thereto is the size of Col. 1 obtained from the Col. Size attribute so that the description in the Col Description attribute reads "ALPHA (15)". A similar process is used for Col 2 wherein the Unisys-specific data-type NUMBER is followed by "(20)" which is used to denote the numerical integer nature and size of Col 2.

Of importance is the insertion of the logical relationship metadata such as those from the attribute block 510 for Col. 4 from the OLE DB-compliant schema 512, into Table 500, particularly for the column attributes of Col Type and Col Description in Table 500. According to an exemplary embodiment of the present invention, a data-type signifying a predetermined enumerated value, such as "BYTES", is inserted in the Col Type attribute of Table 500 for Col. 4. For the Col Description attribute, since no OLE DB-specific type currently is currently mandated for description of logical relationships, a new data string is generated in the present invention to describe a metadata logical relationship link between a referencing table and a referenced table. In an exemplary embodiment as shown in FIG. 5C, the data string is generated by the appending of the character string "LINK->" to a metadata designation, such as a table name, obtained from the structure number of the referenced table in attribute block 510, for a table referenced by the logical relationship link. For example, in the context of the described FIG. 4, the generated alpha-numeric string for Employees 5 would be "LINK->Department", which is determined from the meta-data designation 03 obtained from attribute block 510, wherein 03 is the structure number of the referenced Department Table 402 as described in conjunction with FIG. 4. The generated data string is then stored in the Col Description column-attribute of Table 500 for the row corresponding to Col. 4.

One advantage of the foregoing feature of the present invention over the prior art is allowing for logical relationship metadata in the schema tables of a network modeled database to be presented to a client application. The client-application can then advantageously become aware of the existence of the logical relationships between the data tables in the network modeled database.

In another embodiment of the present invention, once the Link-data-types in an OLE DB-compliant metadata schema are presented to a client application by the method described above, a client application can then, based on a method of the A present invention, utilize the metadata to access a table referenced by a network data modeled database based on the obtained logical-relationship metadata. For example, in the exemplary embodiment of FIG. 4, a client application 100 can now determine which specific department in the referenced Department Table, does Employee 5 work for.

Figure 6:
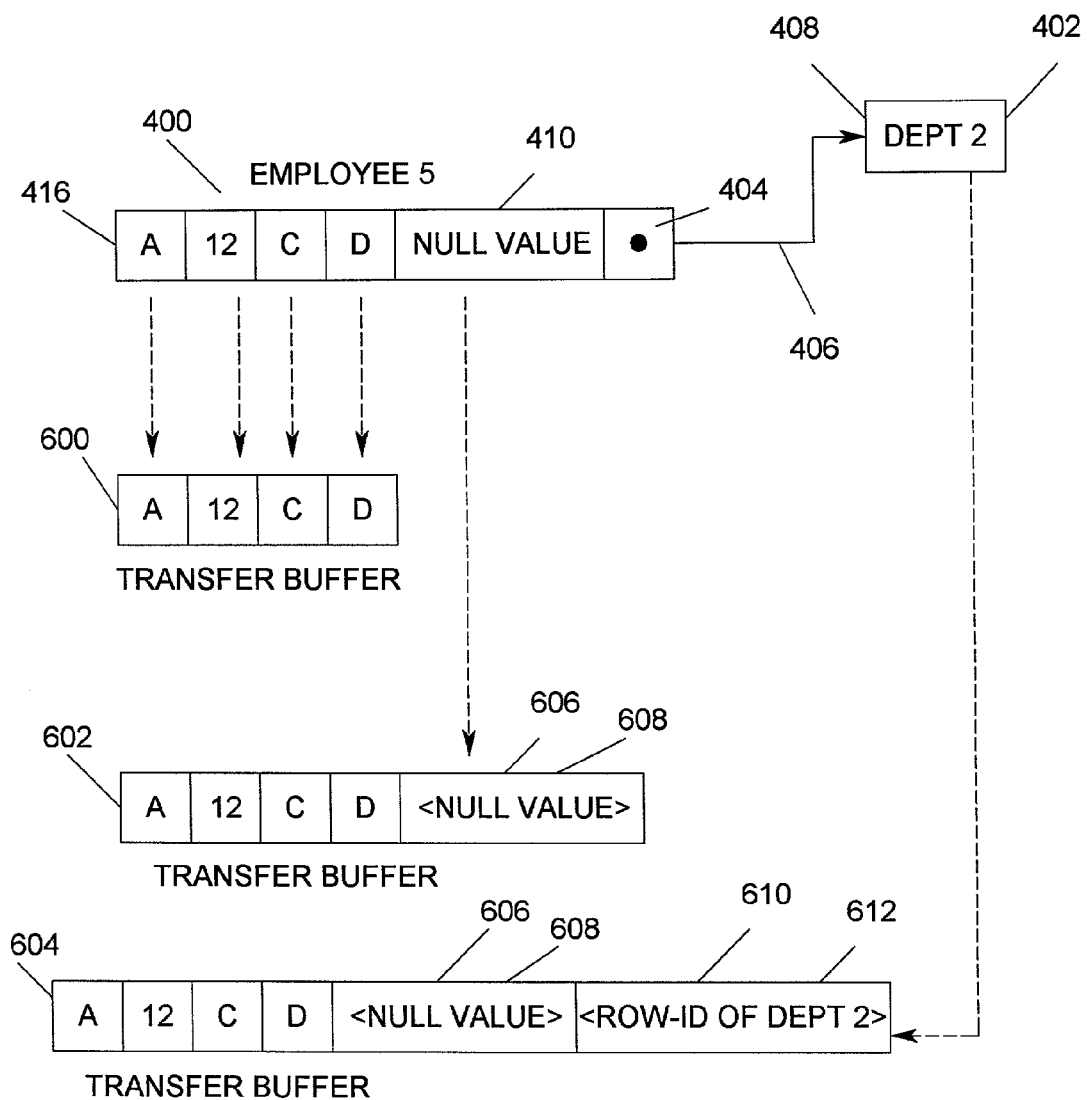
FIG. 6 is a schematic diagram illustrating the accessing of information from a database table according to a method of the present invention.
Figure 7:
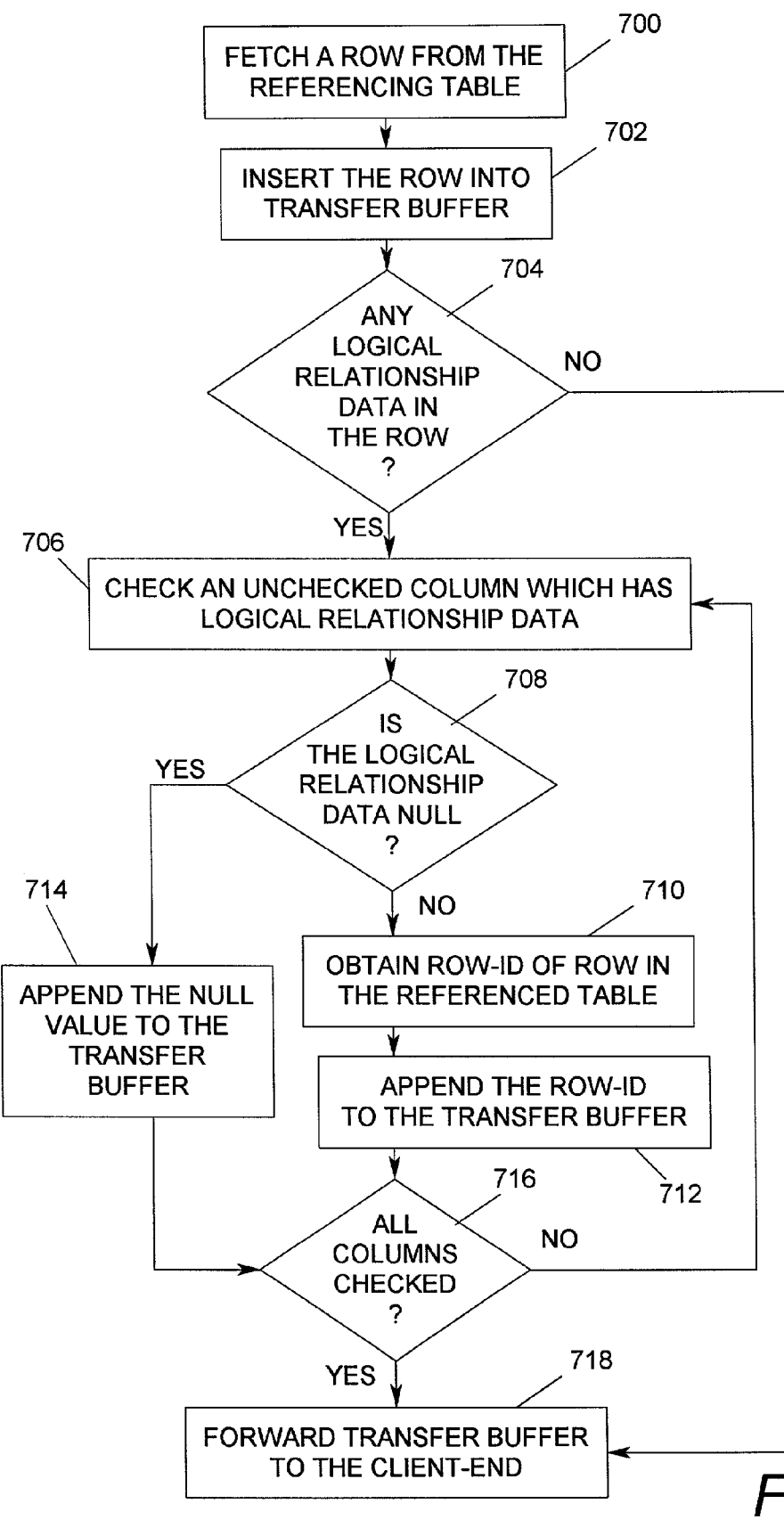
FIG. 7 is a flow chart of the process for accessing information from a database table according to a method of the present invention as illustrated in FIG. 6.

FIG. 7 is a flow chart of an exemplary process for accessing information from a database table according to the method of the present invention. FIG. 6 is a schematic diagram illustrating the process described in FIG. 7. For simplicity, the data table 400 and 402 of FIG. 4 are used to better demonstrate the workings of the present invention, and are duplicated in part in FIG. 6 for ease of illustration. Generally, the client application 100 requests access to real data from the data provider object 25 which forwards the request the worker 27. The worker 27 interfaces with the database server 104 to obtain the requested information and inserts the obtained information in a transfer buffer for forwarding to the data provider object 25.

As shown in FIG. 7 in conjunction with FIG. 6, pursuant to a request from client application 100, at block 700 the worker 27 fetches row 416 for Employee 5 from the Employee Table 400. At block 702, row 416 is inserted into a corresponding transfer buffer, such as transfer buffer 600 in FIG. 6. The data contained in non-link-data-types column-attributes in row 416 are also transferred into corresponding column-attributes of the transfer buffer 600. Next, in decision block 704, row 416 is checked for column-attributes of link-data-type such as column-attributes 410 and 404. If row 416 does not contain any link-data-types column-attributes, then the flow proceeds to block 718 where the transfer buffer is forwarded to the data provider object 25 at client-end 20*a*. For example, if row 416 did not contain link-data-types column-attributes 410 and 404, then a transfer buffer in the form of transfer buffer 600 would be forwarded to the data provider object 25 at client-end 20*a*. Since row 416 does contain link-data-types column-attributes, the flow then proceeds to block 706 where a previously unchecked link-data-type column-attribute is checked for the logical relationship data stored therein.

Next, in the decision block 708, if it is determined that the link-data-type column-attribute contains a null-value signifying that no logical relationship data is stored therein, such as for column-attribute 410, then the flow proceeds to block 714 where a null-value 608 is appended in the corresponding column-attribute 606 of the transfer buffer 602. In an exemplary embodiment, a database management system routine is used to append the null-value 608 to the transfer buffer 602. Next, at decision block 716, if all the link-data-type column-attributes have been checked, then the flow proceed to block 718 where the transfer buffer 602 is forwarded to the data provider object 25 at client-end 20*a*. For example, if row 416 did not contain additional unchecked link-data-types column-attributes, then a transfer buffer in the form of transfer buffer 602 would be forwarded to the data provider object 25 at client-end 20*a*.

Since row 416 does contain additional unchecked link-data-types column-attributes, the flow then returns to block 706 where a previously unchecked link-data-type column-attribute, such as column-attribute 404, is checked for the logical relationship data stored therein. Since column-attribute 404 does not contain a null-value, the flow proceeds from decision block 708 to block 710. As shown in FIG. 6, the logical relationship data stored in column-attribute 404 points to row 408 in the referenced Department Table 402. In block 710, a Row_ID 612 is obtained for the row 408 in the referenced Department Table 402. A Row_ID 612 is a system-assigned unique identification address, such as a unique memory disk address, by which a row can be directly accessed without any searching of the database for the row. In an exemplary embodiment, a database management system routine is used to obtain the Row_ID 612 of row 408. Next, in block 712, the Row_ID 612 is inserted in the corresponding column-attribute 610 of the transfer buffer 604. In an exemplary embodiment, a database management system routine is used to insert or append the Row_ID 612 to the transfer buffer 604. Next, at decision block 716, if all the link-data-type column-attributes have been checked, then the flow proceeds to block 718 where the transfer buffer 604 is forwarded to the data provider object 25 at client-end 20*a*, otherwise the flow would continue to return to block 706 until all column-attributes containing logical relationship data are checked in the manner described above. Since all the link-data-type column-attributes in row 416 have been checked, then the transfer buffer 604 is forwarded to the data provider object 25 at client-end 20*a*.

At the client-end 20*a*, the data provider object 25 of the present invention, receives the forwarded transfer buffer such as transfer buffer 604, and extracts the Row_ID 612 from the transfer buffer 604 based on the previously obtained metadata. The data provide object 25 then creates an OLE DB-compliant book-mark based on the Row-ID 612. The OLE DB models generally allow for rows in a table to be identified by a bookmark. In an exemplary embodiment, a Unisys Enterprise Database OLE DB Data Provider for Clearpath MCP is used which provides full support for OLE DB bookmarks. Once a bookmark has been created based on the Row-ID 612, it is presented to the client application 100, where it enables the client application 100 to directly access data in the bookmarked row in the referenced table, such as row 408 of the referenced Department Table 402. This access includes accessing data stored in each column-attribute of the bookmarked row. In an exemplary embodiment, the accessing includes accessing a different row in the referenced table based on the Row-ID of the bookmark and accessing the data stored in each column-attribute of that row.

One advantage of the foregoing feature of the present invention over the prior art is allowing for the client application to directly access data in the bookmarked row in a referenced table in a networked data modeled database.

In yet another embodiment of the present invention, once the logical relationship data for a referencing table is presented to a client application by the methods described above, a client application can then, based on a method of the present invention, modify the logical relationship link represented by logical relationship data to a table referenced by a network data modeled database. For example, in the exemplary embodiment of FIG. 4, a client application 100 using the method of present invention can now alter the logical relationship data 406 in the Link-data-type column-attribute 404 so that it would point to a different row in the Department Table 402, to for example reflect a recent transfer of Employee 5 from Dept 2 to another department listed in the Department Table 402.

Figure 8A:
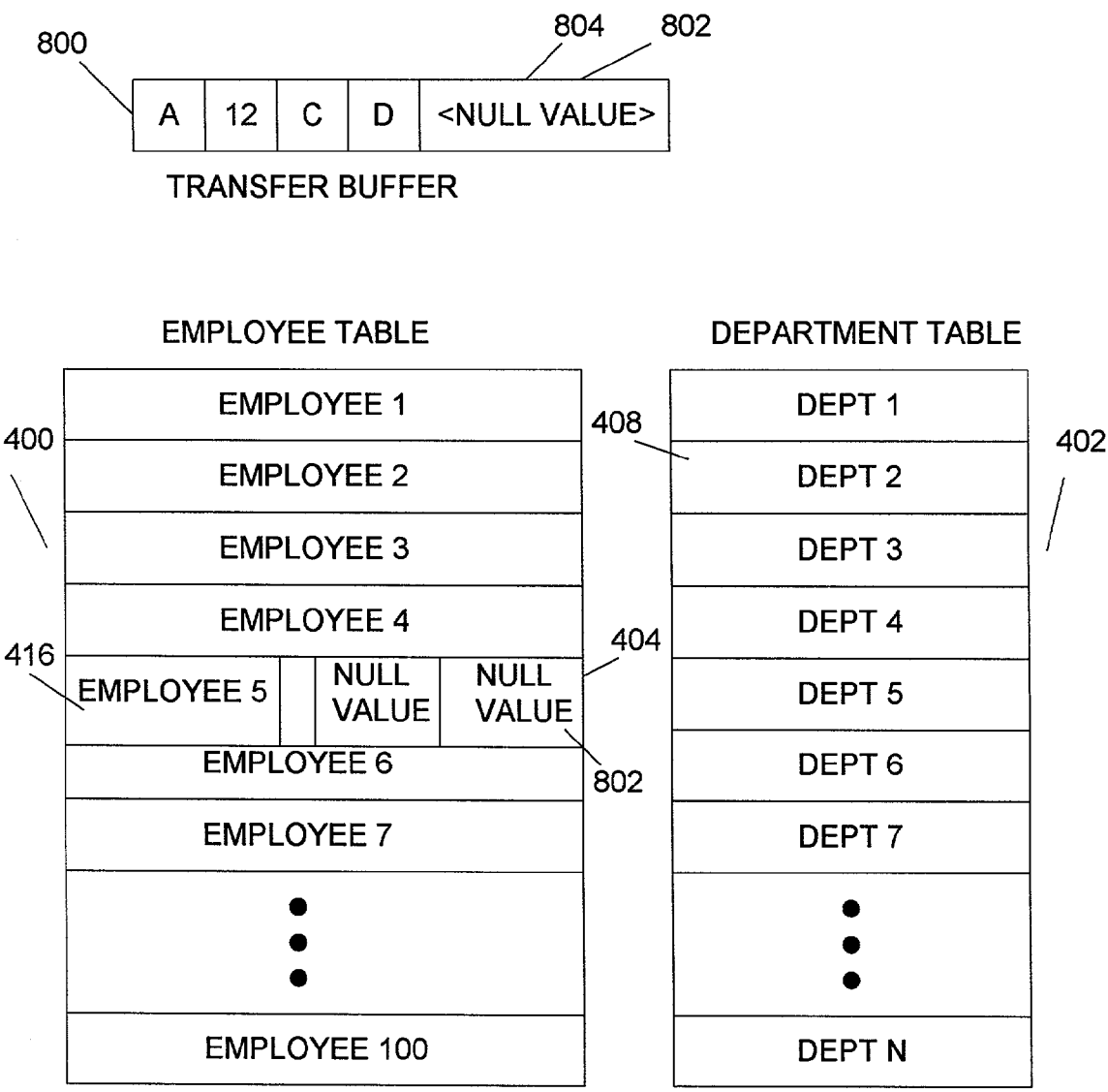
FIG. 8A is a schematic diagram illustrating updating of information in a database table according to a method of the present invention.
Figure 8B:
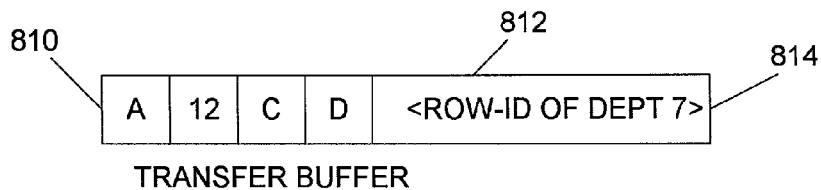
FIG. 8B is a schematic diagram illustrating another updating of information in a database table according to a method of the present invention.
Figure 8B:
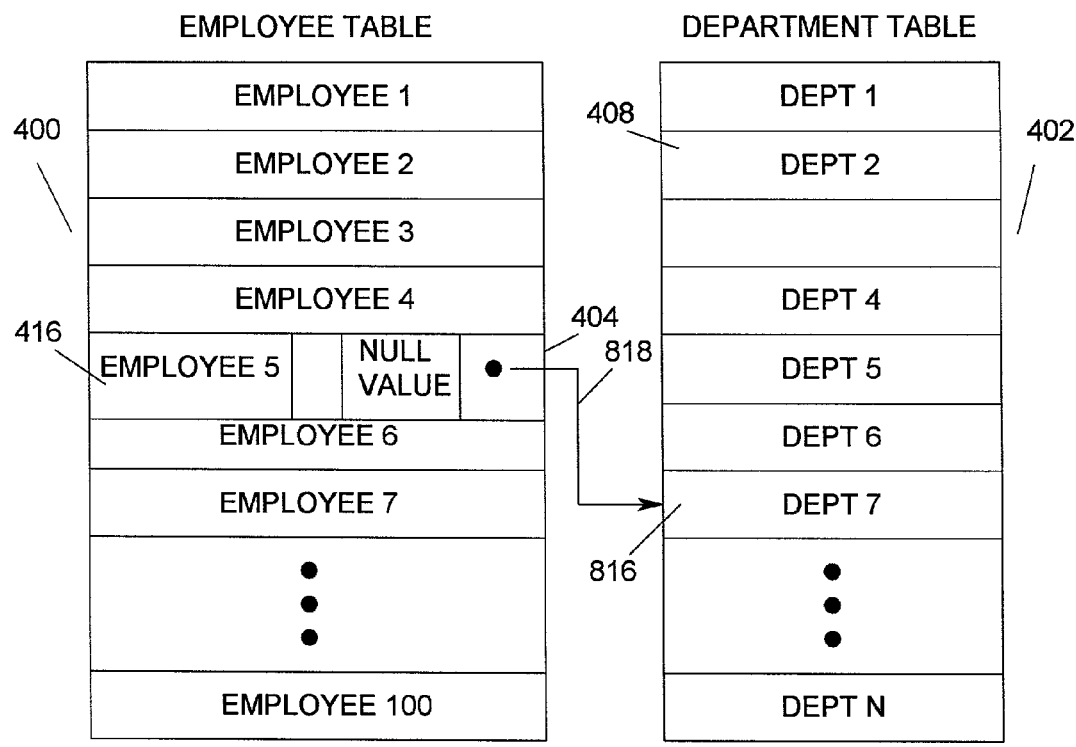
Figure 9:
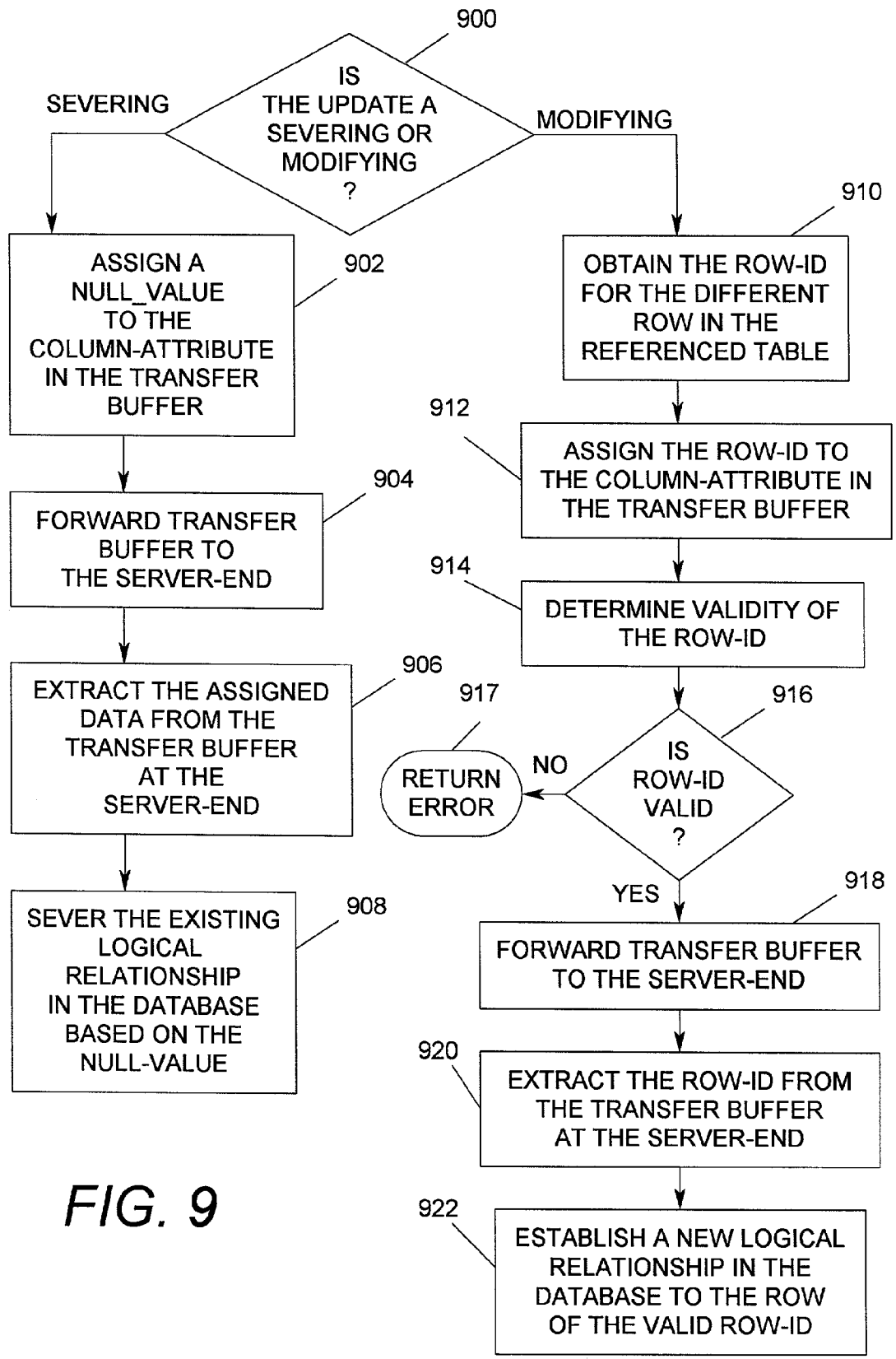
FIG. 9 is a flow chart of the process for updating of information in a database table according to a method of the present invention as illustrated in FIG. 8A and FIG. 8B.

FIG. 9 is a flow chart of an exemplary process for updating a logical relationship link to a table referenced by a network data modeled database. FIG. 8A and FIG. 8B are a schematic diagram illustrating the process described in FIG. 9. For simplicity, the data table 400 and 402 of FIG. 4 are used to better demonstrate the workings of the present invention, and are duplicated in part in FIG. 8A and FIG. 8B for ease of illustration.

As shown in the decision block 900 of FIG. 9, a determination is made as to whether the client application 100 is to sever or modify a logical relationship link to a table referenced by a network data modeled database. If the client application wishes to sever the logical relationship link, then the flow proceeds to block 902 where a null-value is assigned to the column-attribute in a corresponding transfer buffer, such as transfer buffer 800 in FIG. 8A. The transfer buffer 800 corresponds to the row in the referencing table, such as row 416 in the Employee Table 400, that contains the logical relationship link to a row in the referenced table, such as row 408 in the Department Table 402. As shown in FIG. 8A, the null-value 802 is assigned to the column attribute 804 in the transfer buffer 800, that corresponds to the column-attribute 404 in the referencing table containing the logical relationship link to be updated. In an exemplary embodiment, a database management system routine is used to obtain the assigned null-value 802 to the column attribute 804 in the transfer buffer 800.

Next, at block 904, the transfer buffer 800 is forwarded to the server-end 20*b* via the transport object 26 and communication subsystem 22, to worker 27. At block 906, the worker 27 extracts the assigned null-value 802 from the transfer buffer 800. Next, at block 908, the worker 27 interfaces with the database server 104 to store the null-value 802 in appropriate column-attribute of the row in the referencing table, such as in column attribute 404 of row 416 in the Employee Table 400. The null-value signifies an absence of a logical relationship link between the referencing table 400 and the referenced table 402, based on which the database management system for database server 104 severs the logical relationship link between the tables 400 and 402. In an exemplary embodiment, a database management system routine is used to store the null-value 802 in the column attribute 404 of row 416 in the Employee Table 400.

Returning to FIG. 9, if at the decision block 900, it is determined that the client application wishes to modify the logical relationship link between the referencing table 400 and the referenced table 402, then the flow proceeds to block 910. The client application 100 modification includes altering the logical relationship data, such as that in the Link-data-type column-attribute 404 of row 416 in table 400 of FIG. 8B so that it would point to a different row in the Department Table 402, such as to row 816.

In block 910, the Row_ID for the different row in the referenced table, such as row 816 in the referenced Department Table 402, is obtained using the method of the present invention described in FIG. 7. The flow then proceeds to block 912 where the obtained Row_ID is assigned to the column-attribute in a corresponding transfer buffer, such as transfer buffer 810 in FIG. 8B. The transfer buffer 810 corresponds to the row in the referencing table, such as row 416 in the Employee Table 400, that contains the logical relationship link to a row in the referenced table, such as to row 408 in the Department Table 402. As shown in FIG. 8B, the Row-ID 812 is assigned to the column attribute 814 in the transfer buffer 810, that corresponds to the column-attribute 404 in the referencing table 400 containing the logical relationship link to be updated. In an exemplary embodiment, a system routine is used to assign the obtained Row_ID 812 to the column attribute 814 in the transfer buffer 810.

Next, at block 914, to safeguard against the accidental or intentional usage of an invalid Row_ID, the validity of the assigned Row_ID 812 is determined pursuant to a verification process for determining the validity of a Row_ID. In an exemplary embodiment, a checksum-based validity process is used as described in the patent application entitled "SYSTEM AND METHOD FOR VERIFYING VALIDITY OF TRANSMISSION DATA BASED ON A NUMERICAL IDENTIFIER FOR THE DATA filed on Jun. 4, 2002 as U.S. Ser. No. 10/163,105, the details of which are herein incorporated by reference.

Next, at decision block 916, if the assigned Row_ID 812 is determined to be invalid based on the determination in block 914, then an error message 917 is returned. If the assigned Row_ID 812 is determined to be valid based on the determination in block 914, the process flow proceeds to block 918 where the transfer buffer 810 is forwarded to the server-end 20b via the transport object 26 and communication subsystem 22, to worker 27. At block 920, the worker 27 extracts the assigned Row_ID 812 from the transfer buffer 810. Next, at block 922, the worker 27 interfaces with the database server 104 to store the Row_ID 812 in appropriate column-attribute of the row in the referencing table, such as in column attribute 404 of row 416 in the Employee Table 400. The storing of the Row_ID 812 signifies the establishment of a new logical relationship link 818 between the referencing table 400 and the referenced table 402, based on which the database management system for database server 104 will redirect the logical relationship link emanating from the referencing table 400 to point to the new row 816 of Row_ID 812 in the referenced table 402. In an exemplary embodiment, a database management system routine is used to establish the new logical relationship link 818 between the column-attribute 404 of row 416 in the referencing Employee Table 400 and row 816 in the referenced Department Table 402.

One advantage of the foregoing feature of the present invention over the prior art is that a client application can directly update, such as by modifying or severing, a logical relationship link to a table referenced by a network data modeled database.

Figure 10:
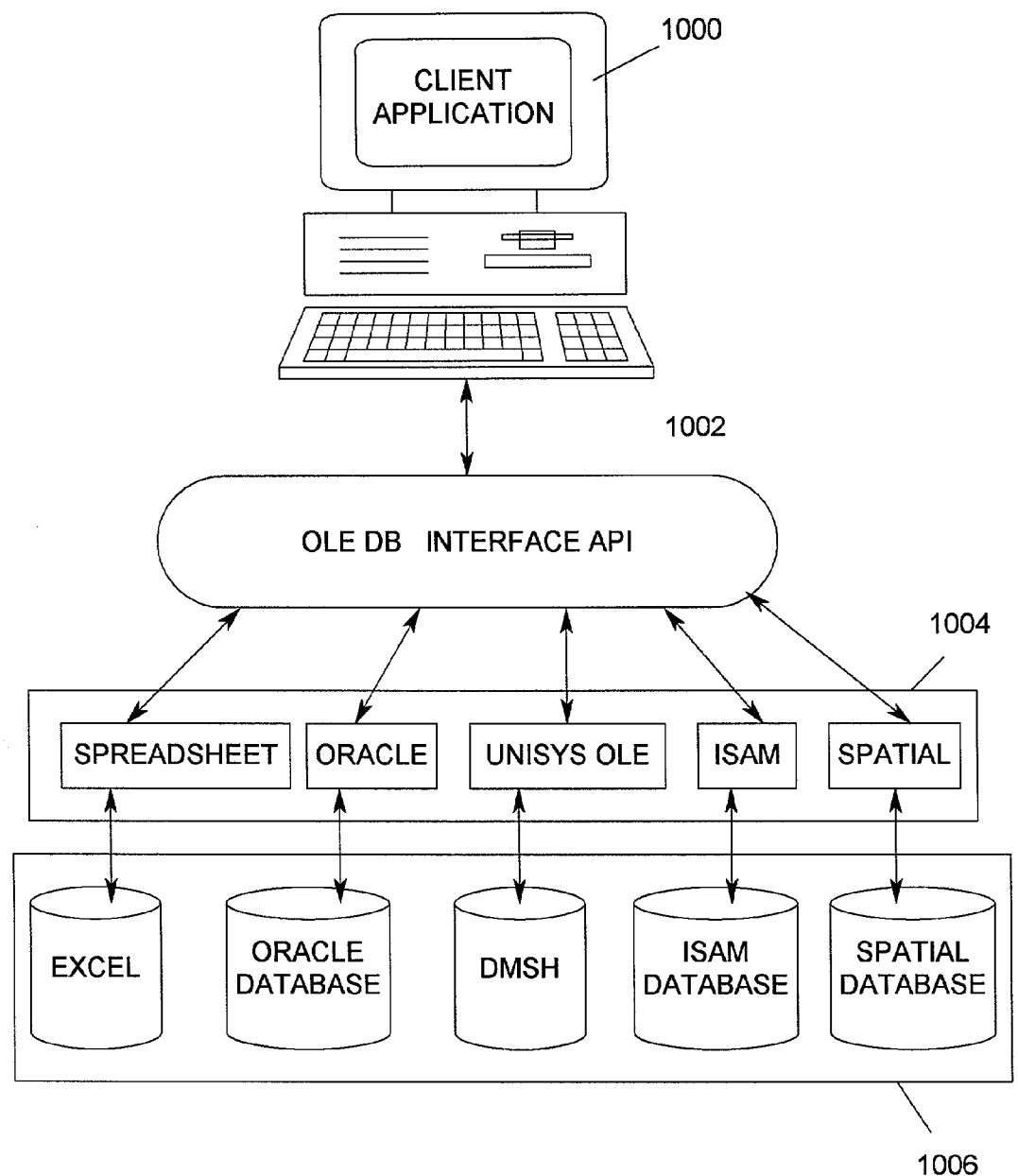
FIG. 10 is an extended block diagram of exemplary systems that may employ the methods and systems of the present invention.

It should be noted that other OLE DB-modeled data-access system utilizing bookmarks, such as OLE DB-modeled spreadsheet, Oracle, ISAM and Spatial could be used in place of a Unisys OLE DB Data Provider. FIG. 10 is an extended block diagram of exemplary systems that may employ the methods and systems of the present invention. A client application 1000 can use OLE DB interfaces 1002 to interface with various OLE DB-modeled Providers 1004, wherein each OLE DB-modeled Provider interfaces with a different one of the databases 1006, such as Excel, Oracle database, ISAM database and Spatial database, as shown.

It should also be noted that the various features of the foregoing embodiments were discussed separately for clarity of description only and they can be incorporated in whole or in part into a single embodiment of the invention having all or some of these features.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A system for allowing a client application to access logical-relationship data in a network data modeled database, said access system comprising:
    a data-access system utilizing bookmarks which functions to obtain said logical-relationship data from said network data modeled database and to present said logical-relationship data to said client application in a predetermined format;
    wherein said data access system is a client-server data access system and further comprising:
        a client-end which functions to interface with said client application;
        a server-end which functions to interface with said network data modeled database; and
        a communication subsystem which functions to relay communications between said server-end and said client-end;
        wherein said server-end further comprising:
            a search means which functions to interface with said network data modeled database, to search said network data modeled database based on requested logical-relationship data received from said client application and to obtain said requested logical-relationship data; and
            a server-end storage means which functions to store said obtained logical-relationship data;
        wherein said server-end forwards said obtained logical-relationship data to said client-end via said communication subsystem;
        wherein said client-end further comprising:
            a client-application interface means which functions to receive said requests from said client application and to present request-results to said client application in said predetermined format recognized by said client application; and a client-end storage means for storing said obtained logical-relationship data forwarded by said server-end wherein said request-results includes said obtained logical-relationship data;

wherein said client-server data access system is based on an object Linking and Embedding Database (OLE DB) data access model;

wherein said logical relationship data includes at least one of real-data and logical relationship metadata wherein said logical relationship metadata represent a logical relationship between a referencing table containing a row having at least one column-attribute and a referenced table in said network data modeled database and wherein said search means functions to obtain metadata designation of each said table;

wherein said search means functions to search schema files in said network data modeled database for said requested logical relationship metadata;

wherein said server-end storage means functions to create an OLE DB-compliant schema file corresponding to each network data modeled database schema file containing said logical relationship metadata;

wherein each said schema file contains at least one schema table containing a row having at least one column-attribute, and wherein said search means functions to search for said logical-relationship metadata in each column-attribute of each row of each schema table in said network data modeled database schema file;

wherein said server-end storage means further comprises a modification means which functions to modify a corresponding column-attribute in said corresponding OLE DB-compliant schema file to include said logical-relationship metadata;

wherein said modification means functions to add at least one extra column-attribute to a corresponding row in said corresponding OLE DB-compliant schema file, and wherein said server-end storage means functions to store said logical-relationship metadata in said added column-attribute;

wherein said client-application interface means further comprises:

a presentation means functions to present said obtained logical-relationship metadata stored in said client-end storage means to said client application in said predetermined format recognized by said client application;

wherein said presentation means functions to create a metadata schema table based on said predetermined format recognized by said client application;

wherein said metadata schema table contains at least one row having at least one column-attribute and wherein said presentation means stores said metadata for each column-attribute in said referencing table in a different row in said metadata schema table based on said predetermined format;

wherein said presentation means further comprises:

a first determination means which functions to determine existence of said logical-relationship metadata in said column-attributes of said referencing table;

an access means which functions to access said row in said metadata schema table corresponding to said column-attribute in said referencing table if said logical-relationship metadata is found by said determination means;

a string-generator means which functions to generate a data string describing a logical relationship between said referencing table and said referenced table; and a driver means which functions to instruct said client-end storage means to insert a predetermined enumerated value in a first predetermined column-attribute of said corresponding row and to store said data string in a second predetermined column-attribute in said corresponding row in said metadata schema table;

wherein said string-generator means functions to append said obtained metadata designation of said referenced table to a predetermined designation indicating a logical relationship to said referenced table;

wherein said first predetermined column-attribute is a data-type field in said OLE DB data access model and indicates a type of data in said corresponding row, wherein said second predetermined column-attribute is a description field column-attribute in said OLE DB data access model, and wherein said predetermined designation is a logical link designation in said OLE DB data access model;

wherein said search means functions to search for said real-data for said referenced table in each column-attribute of said referencing table based on said obtained metadata of said referencing table and to obtain said real-data, wherein said real-data is forwarded to said client-end via said communication subsystem; and wherein said search means further comprises:

a fetching means which functions to fetch a row of said referencing table;

a data insertion means which functions to insert data from said column-attributes of said fetched row into corresponding column-attributes of said referenced table;

a second determination means which functions to determine existence of said real-data in said column-attributes of said fetched row based on metadata obtained for said row;

a referencing means which functions to reference the row in said referenced table addressed by said real-data in said referencing table if a logical relationship metadata is found by said first determination means;

a means which functions to obtain a predetermined row-address for said referenced row from said referenced table; and an instructor means which functions to instruct said server-end storage means to store said obtained row-address in a predetermined column-attribute of a transfer buffer, wherein said request-results includes said obtained row-address.

2. A system in accordance with claim 1, wherein a predetermined null-value is stored in said predetermined column-attribute if no real-data is found by said determination means.

3. A system in accordance with claim 2, wherein said presentation means functions to create an OLE DB-compliant book-mark based on said obtained row-address in said request-results.

4. A system in accordance with claim 3, wherein said client application accesses said network data modeled database on said created bookmark.

5. A system in accordance with claim 4, wherein said client application accesses data stored in each column-attribute of said row identified by said row-address in said referenced table.

6. A system in accordance with claim 4, wherein said client application accesses data stored in each column-attribute of a different row wherein said different row is accessed based on said obtained row-address in said referenced table.

7. A system in accordance with claim 4, wherein said client application modifies a logical relationship link to said referenced table based on said obtained real-data.

8. A system in accordance with claim 7, wherein said client application modifies said logical relationship link to said referenced table by severing said logical relationship between said tables.

9. A system in accordance with claim 8, wherein said client application modifies said logical relationship link to said referenced table by altering said logical relationship data between said tables based on said obtained real-data wherein said altering includes referencing a different row of said referenced table from said referencing table.

10. A system in accordance with claim 1, wherein said network data modeled database is an Enterprise Database Server for Clearpath Master Control Program (MCP) and wherein said logical-relationship is a LINK data type in said Enterprise Database Server.

11. A system in accordance with claim 1, wherein said client application is a Windows™ application.

* * * * *